United States Patent [19]

Mallet

[11] 4,090,496

[45] May 23, 1978

[54] COMPOUNDS FOR FORMING BODIES FOR GENERATING HEAT FROM RADIANT LUMINOUS ENERGY, AND METHODS OF PREPARATION AND APPLICATIONS THEREOF

[75] Inventor: Gilbert Mallet, Crest, France

[73] Assignee: Societe Ciuile Particuliere Cominda Engineering, France

[21] Appl. No.: 647,629

[22] Filed: Jan. 8, 1976

[30] Foreign Application Priority Data

Jan. 17, 1975 France .............................. 75 01392

[51] Int. Cl.² .............................................. F24J 3/02
[52] U.S. Cl. ..................................... 126/271; 126/270; 260/37 EP; 260/40 R; 106/288 B; 252/506
[58] Field of Search ............... 126/270, 271; 237/1 A; 260/37 EP, 40 R; 106/288 B; 252/506

[56] References Cited

U.S. PATENT DOCUMENTS

| 3,239,000 | 3/1966 | Meagher | 126/271 |
| 3,464,854 | 9/1969 | Bolger et al. | 260/37 EP |
| 3,763,088 | 10/1973 | Izawa et al. | 260/37 EP |
| 3,923,697 | 12/1975 | Ellis | 260/37 EP |

*Primary Examiner*—Kenneth W. Sprague
*Assistant Examiner*—James C. Yeung
*Attorney, Agent, or Firm*—Stevens, Davis, Miller & Mosher

[57] ABSTRACT

A compound for forming bodies for generating heat from radiant luminous energy consists of a fluid mixture of 30 to 50% by weight of a reticulatable resin and 70 to 50% by weight of an intimately mixed and finely divided charge, 30 to 60% of which by weight consists of an absorbent black charge and 70 to 40% of which by weight consists of a diffusing white charge. The compound may contain up to 25% glass fibers, expressed as a percentage of the weight of the resin. The black charge may include one or more of the following: graphite and the oxides of iron, copper, manganese, nickel and cobalt. The white charge may contain one or more of the following: alkaline earth carbonates and sulphates and the oxides of silicon, beryllium, magnesium, aluminium, zirconium and thorium. The compound is prepared by homogenously mixing the ingredients in a mixing mill at ambient temperature. The heat generating bodies are formed by casting and polymerizing the compound. A solar panel for heating a fluid is formed by casting and polymerizing the compound round a plane nest of tubes. A radiator is formed by casting and polymerizing the compound in contact with a heat source. A device for heating bodies of water such as the contents of swimming pools comprises such bodies exposed to the sun and slightly submerged in the water, either attached to the pool walls or floating on the pool surface. A submersible device can be used for heating water near the pool bottom.

20 Claims, 4 Drawing Figures

COMPOUNDS FOR FORMING BODIES FOR GENERATING HEAT FROM RADIANT LUMINOUS ENERGY, AND METHODS OF PREPARATION AND APPLICATIONS THEREOF

BACKGROUND OF THE INVENTION

1. Field of the Invention

The invention concerns polymerizable compounds suitable for forming bodies for generating heat from radiant luminous energy, particularly but not exclusively from the energy radiated by the sun.

The invention also concerns methods of preparing such compounds.

The invention is further concerned with the application of such compounds to the formation of generating bodies, especially solar panels and devices for heating bodies of water in open-top containers such as swimming pools.

2. Description of the Prior Art

A known way of capturing radiant luminous energy, in particular energy radiated by the sun, is to place blackened panels such as metal sheets painted matt black, in the path of the radiated energy. The types of paint used do not behave like ideal black bodies at all wavelengths, however, from the visible spectrum to the far infra red, where the majority of the energy radiated in the solar spectrum is concentrated. The principal reasons for this are the low thermal conductivity of the paint and the variation of the thickness which absorbs energy with wavelength. In fact, absorption of the shortest wavelengths, which lie in the visible spectrum and which carry about 48% of the radiant energy, takes place in a surface layer in poor thermal contact with the supporting metal sheet, while the thickness of the black layer is too small to absorb the incident energy of long wavelength, which is relected. Increasing or decreasing the thickness of the black layer can only improve operation at one end of the spectrum at the expense of degrading operation at the other end.

For work on an experimental scale generating bodies have been developed which are made by sintering an intimate mixture of a finely divided absorbent black charge and a finely divided diffusing white charge. The black charges which can be sintered are in the main oxides of titanium, copper, manganese, iron, nickel and cobalt, while the main sinterable white charges are oxides of silicon, beryllium, magnesium, zirconium, and thorium. The mechanism of absorption is believed to be as follows:

The black charges are intrinsically close to ideal black bodies, while diffusion of the radiation in the sintered mass by the white charges traps the radiation, in the manner of a theoretical black body consisting of a hole in a hollow sphere. As a result, absorbtion is virtually complete for all wavelengths of radiation, and occurs practically uniformly throughout the mass of the generating body. Also the thermal conductivity of such oxides is much greater than that of paint.

The technique of sintering involves high pressure and high temperature processes, however, so that it is not possible to make large or complex items in this way except at exorbitant cost. The products are fragile and often stand up poorly to thermal shock, and there is very little scope for coupling them thermally in an efficient manner to other items. Finally, the technique of sintering is hardly compatible with highly efficient and relatively cheap black and white charges such as graphite in the case of the black charges and double carbonates of calcium and magnesium in the case of the white.

SUMMARY OF THE INVENTION

The object of the invention is a polymerizable compound suitable for forming bodies for generating heat from radiant luminous energy, particularly but not exclusively from sunlight, comprising an intimate mixture of a finely divided absorbent black charge and a finely divided diffusing white charge, which can be cast and polymerized to form large generating bodies of complex form which are robust, relatively cheap and behve as substantially ideal black bodies for a range of wavelengths from the far infra red to the visible spectrum.

The invention proposes a polymerizable compound which consists of a fluid mixture of 30 to 50% by weight of a transparent resin which can be reticulated by polymerization and 70 to 50% by weight of a mixed finely divided charge consisting of 30 to 60% by weight, expressed as a percentage of the weight of the mixed charge, of a black charge comprising at least one constituent chosen from the group comprising graphite and the oxides of iron, copper, manganese, nickel and cobalt, and 70 to 40% by weight, expressed as a percentage of the weight of the mixed charge, of a white charge comprising at least one constituent chosen from the group comprising the alkaline earth carbonates, the alkaline earth sulphates, and the oxides of silicon, beryllium, magnesium, aluminium, zirconium and thorium.

The compound may further comprise not more than 25% by weight of glass fibers, expressed as a percentage of the weight of the resin.

Such a compound can easily be formed by casting in a mould or in situ and polymerization, to produce bodies for capturing radiant luminous energy of extremely varied size and shape, and which have practically zero reflectance for all black body spectra from 300° to 6000° K. As a result, energy capturing bodies made from a compound in accordance with the invention, when exposed to normally incident sunlight, are able to produce 1 kilowatt per square meter when the sky is clear, and 500 watts per square meter when the sky is cloudy to the extent that the solar disk is just visible.

The black charge preferably consists of 1 to 80% by weight of powdered graphite with a particle size not exceeding 0.6 microns, and 99 to 20% by weight of at least one anhydrous iron oxide with a particle size not exceeding 0.6 microns, while the white charge contains 10 to 15% by weight, expressed as a percentage by weight of the mixture, of quartz with a particle size not exceeding 3 microns, the remainder being an anhydrous double carbonate of calcium and magnesium with a particle size not exceeding 0.6 microns.

These charges are relatively cheap and very efficient at absorbing luminous energy, and they contribute to the good mechanical properties of the energy capturing bodies after polymerization.

The reticulatable resin may be a known epoxy resin composed of a resinous component mixed with a hardener and which can be polymerized by raising its temperature, the proportion of hardener being limited in the known manner to ensure that the mixture remains fluid.

The reticulatable resin may instead be a known polyester resin which can be reticulated by adding an appropriate catalyst, and containing 0.2 to 3% by weight, expressed as a percentage of the weight of the resin, of dispersed powdered anhydrous cobalt oxide with a particle size not exceeding 0.6 microns.

The compounds are stable and remain fluid enough to permit forming by casting. Polymerization can easily be carried out without pressurizing means and in simple moulds, such as silicone mouldings, or even directly, into a recess in a masonry structure, for example.

Other objects of the invention are methods for preparing compounds as defined above.

The compound is prepared by placing the reticulatable resin, the black charge and the white charge in succession and at ambient temperature into a mixing mill, and the homogenous mixture is discharged into closed containers for later forming by polymerization.

In a preferred method the polyester resin, the anhydrous cobalt oxide (after homogenous dispersal thereof), the anhydrous iron oxide, the graphite, the double carbonate of calcium and magnesium, and the quartz are placed in succession and at ambient temperature in a mixing mill, and the homogenous mixture is discharged into closed containers for later forming by polymerization by the addition of an appropriate catalyst.

Further objects of the invention are bodies for generating heat from radiant luminous energy, formed by casting and induced polymerisation of a compound as defined above.

It is advantageous to give at least part of the surface of the body a matt finish after polymerization, by washing it with a suitable solvent, such as methyl ethyl ketone. The surface shine of the polymerized resin is thus eliminated.

The generating body may be in the form of a solar panel for transferring radiant energy to a fluid flowing through a substantially plane nest of tubes embedded in a plate which follows the plane of the tube nest and is formed by polymerizing a cast compound as defined above.

The solar panel may include a thermally insulative enclosure around the plate, having at least one transparent face spaced from the plate.

Energy losses in the surrounding environment are thus reduced, by reduction of convection and the greenhouse effect which occurs between the plate and the transparent face.

The compound is also suitable for forming radiators for distributing energy from a heat source in the form of radiation, such a radiator consisting of a plate moulded from the compound in contact with the heat source. The heat source may be a nest of tubes through which flows a hot fluid, or an electrical heater resistance, for example.

The compound in accordance with the invention is particularly suitable for forming devices for heating bodies of water held in open-topped containers such as swimming pools, using radiant energy from the sun. Such a device comprises a plate formed by moulding and polymerizing a compound as defined above, at least partly immersed in said body of water with an active face exposed to the sun. The plate absorb the solar energy and transmit it to the water by conduction and convection.

In a first arrangement, such plates are attached substantially horizontally to the walls of the container, with their upper faces submerged to a small depth in the body of water. A heating curb is thus formed which can take the chill off the water in a pool without energy costs.

In another arrangement, such a plate has its active face covered with a transparent dome sealed to it in watertight manner by a peripheral flange, the plate and the dome forming together a float able to maintain said active face directed upwards and horizontal a small distance below the surface of the body of water.

Floats formed in this way are left to float in the water to be warmed. Their hydrostatic stability ensures that the active face absorbing energy from the sun is maintained horizontal and that the plate is immersed to be in good thermal contact with the water.

In a modified form of this arrangement, the dome is divided by a watertight transparent wall substantially parallel to the active face into two chambers, a first watertight chamber in contact with said active face and a second chamber with inlet orifices spaced along the dome perimeter in the vicinity of said wall, a pumping out adjutage being provided at the summit of the dome and the volumes of the first and second chambers being so chosen that the device has negative buoyancy when the second chamber is filled with water, flowing through the inlet orifices, and positive buoyancy with the second chamber emptied of water by compressed air introduced through the adjutage and a flexible conduit from a compressed air source.

In this modification, the heating device may be submerged in the body of water to warm deeper layers, by filling the second chamber, and easily brought to the surface by pumping out the second chamber.

The objects and advantages of the invention will appear from the following description, given by way of example only and with reference to the accompanying drawing.

DESCRIPTION OF THE PREFERRED EMBODIMENTS

Figure 1:
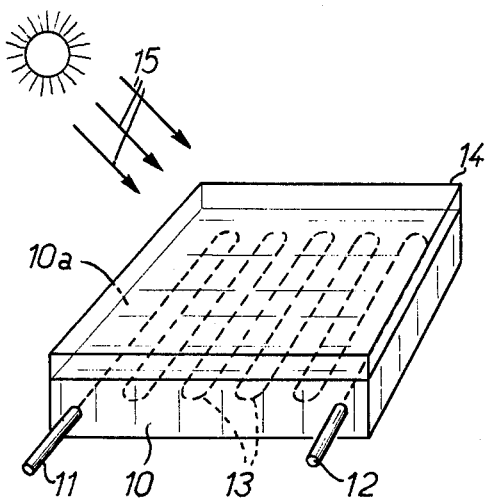
FIG. 1 shows a solar panel in accordance with the invention.

Depending on the embodiment selected, a compound suitable for forming by casting and polymerization is made up as follows:

325 Parts by weight of a so-called flexible polyester resin are placed in a mixing mill at ambient temperature, and to it are added 3 parts by weight of cobalt oxide of flour-like consistency, i.e. with a particle size not exceeding 0.6 microns. After homogenously dispersing the cobalt oxide, 130 parts by weight of anhydrous iron oxide are added, with a particle size not exceeding 0.6 microns. This oxide consists of at least one of the oxides $FeO$, $Fe_2O_3$ and $Fe_3O_4$. There are then added in succession: 190 parts by weight of graphite with a particle size not exceeding 0.6 microns, 250 parts by weight of a double carbonate of calcium and magnesium with a particle size not exceeding 0.6 microns, and 90 parts by weight of powdered quartz with a particle size not exceeding 3 microns. After homogenous mixing of the thus charged resin 12 parts by weight of glass fibres are added and dispersed. The compound is still fluid and is discharged into containers which are closed and where it is kept for eventual formation of generating bodies.

To make the generating bodies suitable moulds are prepared. They may advantageously be of silcone resin.

The necessary amount of a suitable catalyst is added to the compound in a mixing mill, usually being delivered with the polyester resin by the supplier of the latter, and generally based on phthalic anhydride. The compound mixed with the hardener is cast into the moulds. If the generating body is large and is to be installed once and for all, for example as a flat roof covering on a building, the compound mixed with catalyst can be cast directly on site, onto a suitably prepared support surface.

After polymerization the body is given a matt surface by washing it down with methyl ethyl ketone. This removes the surface shine of the polyermized resin, which reduces the reflectivity and so increases the efficiency of absorption.

Generating bodies made in this way, by polymerization of the compound in accordance with the invention, generally have a specific gravity of about 2 and a working temperature range of $-50°$ to $140°$ C.

Since the majority of the energy radiated by the sun lies in the long wavelengths of the visible spectrum and in the infra red, the reflectivity at short wavelengths in the visible spectrum can be non-zero without significant reduction of the efficiency of absorption. This means that the generating bodies can be of a dark predominantly green or blue color without noticable decrease in output. By selecting the composition of the iron oxide, varying the proportions of ferrous and ferric oxides, and by covering the polymerized generating bodies with a thin layer of resin containing suitable coloring agents, it is possible to produce generating bodies with colors close to those of classical building materials, especially covering materials such as tiles and slates. This feature, in combination with the moulding facility, means that generating bodies can be produced with looks that merge in with the general architecture of a building.

The solar panel shown in FIG. 1 consists of a plate 10 moulded from a compound in accordance with the invention.

A tube having end portions 11 and 12 and a middle portion 13, shown in dashed outline and bent into a plane nest, is embedded in the plate 10, lying approximately in its median plane. The plate 10 is surrounded by a thermally insulative enclosure, part of which consists of a transparent cover 14 over the active face 10a of the plate, which is exposed to sunlight. The cover 14 is substantially parallel to the face 10a, and slightly spaced from it. The radiant luminous energy passes through the transparent cover 14 and is virtually wholly absorbed by the plate 10. Almost all this energy is transmitted to a fluid flowing through the tube 13 between the end portions 11 and 12. The thermally insulative enclosure opposes energy losses. In particular, cooling of the plate 10 by convection from the face 10a is reduced by confining air between this face and the transparent cover 14, and cooling by radiation in the far infra red corresponding to the temperature aquired by the plate 10 is reduced due to the fact that the cover 14 has a high reflectivity at these wavelengths, the combined effect of these phenomena constituting the well known greenhouse effect.

Figure 2:
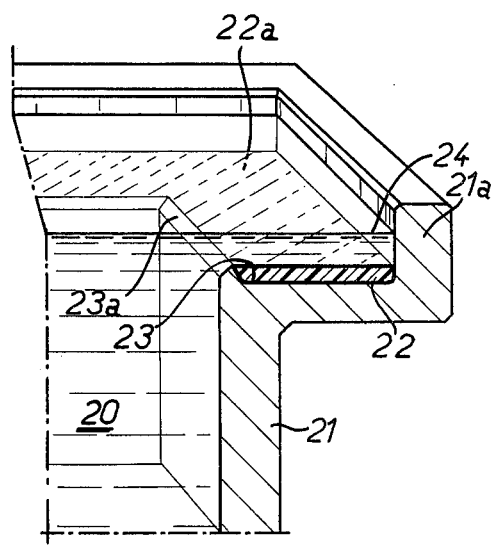
FIG. 2 shows a device for warming a swimming pool, in the form of a heating curb therefor.

Referring to FIG. 2, at the perimeter of a body of water 20 confined by walls 21 to constitute a swimming pool, a shelf 23 in the curb 21a of the pool forms part of a device for warming the pool. The shelf 23 has a lip 23a, and a peripheral plate is cast on the shelf between the lip 23a and the curb 21a, from a suitably polymerized compound in accordance with the invention. The quantity of water in the pool is such that the surface is slightly above the plate 22 and parallel to its upper surface. Sunlight passes through the layer of water over the plate 22 to be absorbed by the plate, which heats up and warms the layer of water with which it is in contact. Movement of the water surface facilitate diffusion of the warmed water through the pool. It should be noted that refraction of the sunlight by the thin layer of water reduces the angle of incidence on the plate relative to that in air, which increases the energy absorbed.

Figure 3:
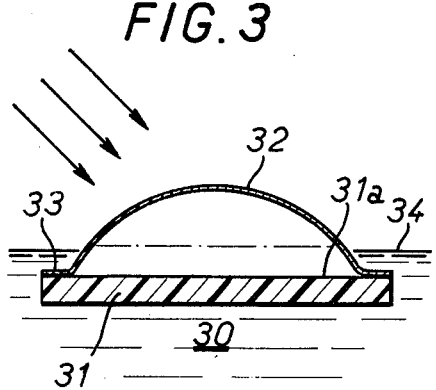
FIG. 3 shows a floating device for warming a swimming pool.

The water of a swimming pool can also be warmed using the device shown in FIG. 3, which is intended to be left floating in the pool as long as is required to take the chill off the water. The device includes a circular or polygonal plate 31 moulded from a compound in accordance with the invention. The upper face 31a of the plate 31, which is the active face, is covered with a transparent dome 32 made, for example, from methyl methacrylate. The periphery of the dome 32 is formed as a flange 33 which is sealed in watertight manner, by bonding or otherwise, to the periphery of the face 31a of the plate 31. The shape and volume of the dome 32 are such that when the device is left to float in the body of water 30 to be warmed it floats with the active face 31a parallel to and slightly below the surface 34 of the water. As the polymerised compound has a specific gravity of about 2, the depth to which the face 31a is immersed is of the same order as the thickness of the plate 31, i.e. a few centimeters. The energy which is absorbed by the plate 31 is transferred to the water 30 by conduction and convection, and the dome forms a greenhouse which reduces heat loss to the atmosphere. It should be noted that the devices floating on the surface of the pool also reduce heat loss from the water to the atmosphere. It hardly needs mentioning that the heating devices must be taken out of the pool before it can be used.

Figure 4:
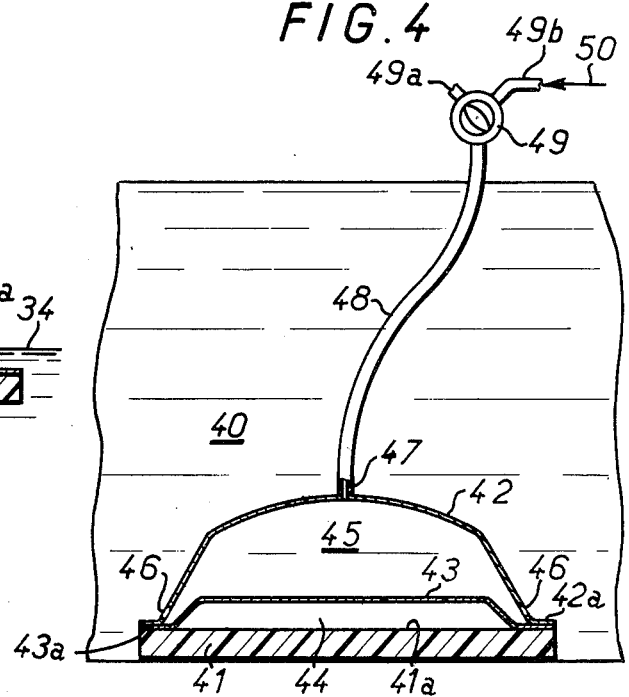
FIG. 4 shows a submersible device for warming a swimming pool.

The device for warming the water of a swimming pool shown in FIG. 4 is intended for heating at a depth, particularly when the circulation of water is not sufficient to homogenize the temperatures of the deep and the surface layers. The device includes a plate 41 of a cast and polymerized compound in accordance with the invention and a transparent dome 42, analagous to the plate 31 and dome 32 of FIG. 3. The dome 42 is, however, divided into two superposed chambers 44 and 45 by a transparent and watertight wall 43 substantially parallel to the active face 41a. The first chamber 44 is in contact with the active face 41a and is sealed by bonding its peripheral flange to the periphery of the active face 41a, whereas the chamber 45 is in communication with the body of water 40 by virtue of inlet orifices 46 spaced along the perimeter of the dome 42 in the vicinity of the wall 43, i.e. close to the flange 42a of the dome which is bonded to the flange 43a of the wall 43. The chamber 45 is also provided with an adjutage 47 located in the region of the summit of the dome 42. By means of a flexible conduit 48 and a three-way valve 49 outside the pool, the adjutage 47 connects the chamber 45 to atmosphere, through outlet 49a, or to a compressed air source 50 through outlet 49b.

The shapes and volumes of the chambers 44 and 45 are selected, in accordance with the thickness of the plate 41, so that the buoyancy of the device is negative when the chamber 45 is filled with water and positive when the chamber 45 is full of air.

When the device is placed in the water 40 and the valve 49 set to the position which connects the conduit 48 to the outlet 49a, water enters chamber 45 through the filling orifices and drives out the air through the pumping out orifice 47, the conduit 48 and the outlet 49a. The heating devices settles gradually until it sinks to the bottom. Sunlight which is not absorbed by the water 40 and which reaches the active face 41a is absorbed by the plate 41, whose rise in temperature is communicated to the surrounding water. As the radiation absorbed by the water 40 contributes to warming the water, the overal efficiency is practically unchanged, but since the main heating effect takes place at the bottom of the water 40 general convection warms the body of water uniformly. To remove the heating device the valve is changed over to connect the compressed air source 50 to the conduit 48. The compressed air source may be of any suitable type, so long as the output pressure is sufficient to overcome the pressure caused by the submersion of the device. The compressed air entering the chamber 45 through the pumping out adjutage 47 drives out the water through the filling apertures 46 so that the device aquires positive buoyancy and comes to the surface.

It will be readily understood that the invention is not limited to the examples described, and that numerous modifications may be made without departing from the scope of the invention, as much as regards the proportions and nature of the components as regards the applications.

Thus, although the invention is pricipally directed to domestic applications of capturing solar energy, industrial and scientific applications are not excluded, as much for capturing solar energy as for capturing any energy radiated by a source at high temperature. The choice of reticulatable resins able to withstand a wider range of temperatures would widen the field of application accordingly.

I claim:

1. A polymerizable compound suitable for casting or molding bodies for generating heat from radiant luminous energy, particularly but not exclusively from sunlight, comprising a fluid mixture containing 30 to 50% by weight of a transparent resin which can be reticulated by polymerization, and 70 to 50% by weight of an intimate mixture of:
   (a) a finely divided absorbent black charge constituting 30 to 60% by weight of the mixture and composed of at least one constituent selected from the group consisting of: graphite and the oxides of iron, copper, manganese, nickel and cobalt, and
   (b) a finely divided diffusing white charge constituting 70 to 40% by weight of the mixture and composed of at least one constituent selected from the group consisting of: the alkaline earth carbonates and sulphates and the oxides of silicon, beryllium, magnesium, aluminum, zirconium and thorium.

2. A body for generating heat from radiant luminous energy, formed of a cast or molded polymerized compound comprising 30 to 50% by weight of a transparent, thermally reticulatable resin and 70 to 50% by weight of an intimate mixture of:
   (a) a finely divided absorbent black charge constituting 30 to 60% by weight of the mixture and composed of at least one constituent selected from the group comprising graphite and the oxides of iron, copper, manganese, nickel and cobalt; and
   (b) a finely divided diffusing white charge constituting 10 to 40% by weight of the mixture and composed of at least one constituent selected from the group comprising the alkaline earth carbonates and sulphates and the oxides of silicon, beryllium, magnesium, aluminum, zirconium and therium.

3. A body as set forth in claim 2, further comprising not more than 25% of glass fibres, expressed as a percentage of the weight of the resin.

4. A body as set forth in claim 2, wherein said black charge contains 1 to 80% by weight powdered graphite with a particle size not exceeding 0.6 microns and 99 to 20% by weight of at least one anhydrous iron oxide with a particle size not exceeding 0.6 microns, and said white charge contains 10 to 15%, expressed as a percentage of the weight of said intimate mixture, of quartz with a particle size not exceeding 3 microns, the remainder of said white charge being an anhydrous double carbonate of calcium and magnesium with a particle size not exceeding 0.6 microns.

5. A body as set forth in claim 4, wherein said resin is a polyester resin which is polymerisable by adding an appropriate catalyst and which contains 0.2 to 3% of powdered anhydrous cobalt oxide with a particle size not exceeding 0.6 microns, expressed as a percentage of the weight of the resin.

6. A body as set forth in claim 5, comprising substantially 325 parts by weight of a flexible polyester resin, substantially 3 parts by weight of cobalt oxide, substantially 130 parts by weight of at least one anhydrous iron oxide, substantially 190 parts by weight of graphite, substantially 250 parts by weight of double carbonate of calcuim and magnesium, 90 parts by weight of quartz, and substantially 12 parts by weight of glass fibres.

7. A body as set forth in claim 2, wherein said resin is an epoxy resin which is polymerisable by raising its temperature and consists of a mixture of a resinous component and a hardener, the proportion of said hardener being limited to ensure that said mixture remains fluid.

8. A body as claimed in claim 2, with at least part of its surface having a matt finish.

9. A device for heating a pool of water contained in an open-topped enclosure, comprising a body as claimed in claim 2, wherein said body is of slab-like construction, having an active face adapted to be exposed to the source of radiant energy, and adapted to be at least partly disposed below the normal surface level of such a pool of water.

10. A device as set forth in claim 9, wherein said slab-like body is adapted to be fixed to an extent in a position substantially horizontally from a wall of such an enclosure, said active face being defined by its upper surface.

11. A device as set forth in claim 9, further comprising a transparent dome having a peripheral flange sealed watertight to said slab-like body, the sealed unit formed by the body and the dome being floatable for maintaining said active surface substantially horizontal and facing upward and at a small distance below the surface of such a pool of water.

12. A device as set forth in claim 11, wherein the interior of said dome is divided by a transparent watertight wall substantially parallel to said active surface into a first watertight chamber in contact with said active surface, and a second chamber, inlet orifices communicating with said second chamber and spaced along the dome periphery in the vicinity of said wall, and a hose connected to the top of said dome for introducing compressed air into said second chamber, the volumes of said first and second chambers being so chosen that said device has an average density greater than that of water when said second chamber is filled with water, and an average density less than that of water when said second chamber is emptied of water by compressed air pumped into said second chamber.

13. A device as set forth in claim 9, in combination with said enclosure wherein the enclosure comprises a ledge at its open end, and wherein said slab-like body is disposed substantially horizontally and along at least part of the inner periphery of said enclosure on said ledge.

14. A device as set forth in claim 13, wherein said enclosure is a swimming pool.

15. A solar panel for heating a fluid, comprising a substantially planar tube array for carrying the flow of a fluid, and embedded in said body as claimed in claim 2, said body being of slab-like configuration.

16. A panel as set forth in claim 15, comprising a thermally insulative enclosure surrounding said plate-like body and having at least one transparent face spaced therefrom.

17. A method of preparing a body for generating heat from radiant luminous energy formed of a polymerized compound, comprising: forming a fluid mixture containing 30 to 50% by weight of a transparent, thermally reticulatable resin and 70 to 50% by weight of an intimate mixture of a finely divided absorbent black charge constituting 30 to 60% by weight of the mixture and composed of at least one constituent selected from the group comprising graphite and the oxides or iron, copper, manganese, nickel and cobalt, and of a finely divided diffusing white charge constituting 70 to 40% by weight of the mixture and composed of at least one constituent selected from the group comprising the alkaline earth carbonates and sulphates and the oxides of silicon, berylium, magnesium, aliminum, zirconium and thorium, wherein the improvement comprises the step of placing successively said reticulatable resin, said black charge and said white charge at ambient temperature into a mixing mill, mixing them homogeneously therein, pouring the homogenized mixture into a mold, and then heating the poured mixture to polymerize it.

18. A method as claimed in claim 17, further comprising the step of adding not more than 25% of glass fibers, expressed as a percentage of the weight of the resin, before pouring into said mold.

19. A method as claimed in claim 17, further comprising washing at least part of the surface of the polymerized body with a suitable solvent to provide it with a matt finish.

20. A method as claimed in claim 19, wherein said solvent is methyl ethyl ketone.

* * * * *

UNITED STATES PATENT AND TRADEMARK OFFICE
CERTIFICATE OF CORRECTION

PATENT NO. : 4,090,496
DATED : May 23, 1978
INVENTOR(S) : Gilbert MALLET

It is certified that error appears in the above-identified patent and that said Letters Patent are hereby corrected as shown below:

Please correct the above-identified Patent as follows:

Column 5, line 12, "polyermized" must read - polymerized -.

Column 7, line 20, "aquires" must read -- acquires --.

Column 10, line 9, berylium" must read -- beryllium --.

line 9, "aliminum" must read -- aluminum --.

Signed and Sealed this

Thirty-first Day of October 1978

[SEAL]

Attest:

RUTH C. MASON
Attesting Officer

DONALD W. BANNER
Commissioner of Patents and Trademarks